May 19, 1970 C. F. AULT 3,512,733

TAPE TRANSPORT FOR INCREMENTAL STEPPING RECORDER

Filed April 24, 1968

INVENTOR
C. F. AULT
BY
ATTORNEY

United States Patent Office 3,512,733

Patented May 19, 1970

3,512,733

TAPE TRANSPORT FOR INCREMENTAL STEPPING RECORDER

Cyrus F. Ault, Wheaton, Ill., assignor to Bell Telephone Laboratories, Incorporated, Murray Hill and Berkeley Heights, N.J., a corporation of New York Filed Apr. 24, 1968, Ser. No. 723,711
Int. Cl. B65h 59/38; G03b 1/04; G11b 15/32
U.S. Cl. 242—190 8 Claims

ABSTRACT OF THE DISCLOSURE

The characteristics of permanent magnet direct current motors are used in apparatus for controlling the tape tension in a magnetic tape recorder and at the same time providing rapid wind or rewind operation. Individual permanent magnet motors are linked with respective tape reels and interconnected into power supply circuitry actuated by switches responsive to tension arm devices. Depending on the tape tension on each tension arm device, the respective switch associated therewith either applies power to the respective motor or places it in a dynamic braking state, thereby holding the tape tension within a prescribed range. For rapid wind or rewind operation, continuous power is applied to the motor associated with the tape take-up reel.

BACKGROUND OF THE INVENTION

This invention relates to magnetic recording systems and, more particularly, to apparatus for controlling the tape tension and for providing rapid wind and rewind capability in magnetic tape recorders.

In the operation of magnetic tape recorders, it is generally necessary to maintain the tape under proper tension to prevent breakage and to insure that it is accurately guided past the recording head. Numerous structures are known in the art for controlling the tape tension in tape recorders. Some structures, such as those using proportional servos, control tape tension adequately but are relatively complex and expensive to construct. Furthermore, other structures, such as those employing friction devices, are unable to provide rapid wind and rewind operation.

Summary of the invention

Accordingly, it is an object of this invention to provide relatively simple, inexpensive apparatus for controlling the tape tension on a tape recorder.

A further object of this invention is to provide a tape tension controlling apparatus which also provides rapid wind and rewind capabilities.

The above and other objects are attained in an illustrative incremental tape recorder wherein respective permanent magnet, direct current motors are employed to drive the supply and take-up reels. Switches activated by tension arms of the tape recorder are interconnected in accordance with this invention into shunt conduction paths around the armature windings of the direct current drive motors, thereby advantageously utilizing the drive motors to maintain the proper tape tension. The switch in shunt with the armature of the supply reel motor is normally closed and opens with increasing tape tension; and the switch in shunt with the armature of the take-up reel motor is normally open and closes with increasing tape tension.

When the armature shunt path of either motor is open, such motor receives power and drives its respective tape reel. When the shunt path is closed, the motor armature is short circuited, producing dynamic braking of the respective reel. Thus, as the tape is advanced from the supply reel to the take-up reel by a capstan, the respective tension arm switches produce alternating periods of power-on and dynamic braking, and the tape tension is thereby maintained within desired limits.

Additionally included in each of the shunt conduction paths are normally-closed, manually-operated switches which are used to provide rapid wind of the tape. When rapid wind is desired, the manual switch in shunt with the take-up reel motor is opened. The take-up reel motor then accelerates toward a predetermined rapid wind speed while the supply reel motor alternates between a power-on condition and dynamic braking under control of the tension arm switch associated therewith. For recording in the rewind direction and for rapid rewind, additional shunt paths and switches are provided to permit the direct current motors to drive the tape in the reverse direction.

A feature of this invention, therefore, relates to the use of permanent magnet direct current motors to drive the supply and take-up reels of a tape recorder and to circuitry utilizing the dynamic braking characteristics of the motors to maintain tape tension within predetermined limits.

Another feature of this invention relates to apparatus including direct current motors used to regulate tape tension for providing rapid wind and rewind capability for the recorder.

Brief description of drawings

These and other objects and features of the present invention may be better understood upon consideration of the following detailed description and the accompanying drawing in which.

Detailed description

Figure 1:
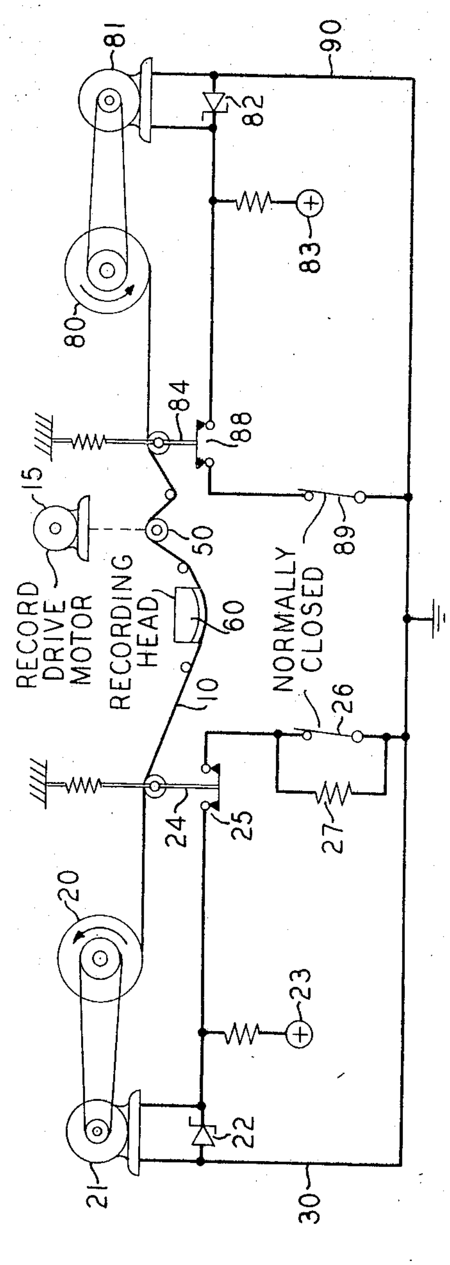
FIG. 1 is a diagram of an illustrative embodiment of an incremental tape recorder in accordance with the invention showing circuitry for providing tape tension control and rapid wind capability.

An illustrative incremental tape recorder in accordance with the invention comprising a conventional recording head 60 situated in recording relationship with magnetic tape 10 is shown in FIG. 1. Tape 10, wound on supply reel 20 and on take-up reel 80, moves horizontally from left to right in FIG. 1 along a path adjacent head 60. Tape 10 is driven during the incremental recording operation by motor 15 through capstan 50. Tension arm devices 24 and 84, attached to spring components in the manner shown in FIG. 1, respond to the tape tension between capstan 50 and reels 20 and 80, respectively, and thereby control respective tension switches 25 and 88. The drive shafts of reels 20 and 80 are individually linked mechanically to motors 21 and 81. The mechanical linkage is shown in the drawing as a belt-pulley arrangement, but it is apparent that any other form of drive mechanism could be used.

Motors 21 and 81 are substantially identical in the embodiment shown in FIG. 1 and may comprise, for example, conventional permanent magnet direct current motors or other known motors having the characteristics discussed hereinbelow. However, as will be apparent from the discussion below, motors 21 and 81 are specially constructed to have a maximum indexing torque so as to maintain a suitable tension on the tape. Toward this end, the motors are advantageously constructed, for example, with a two-pole stator and four salient rotor poles. An alternative approach to construction of motors 21 and 81 would be to slot the stator at appropriate intervals to produce a variable reluctance holding action.

Motors 21 and 81 are connected into respective power supply conduction paths 30 and 90 extending between sources 23 and 83, respectively, and ground. Zener diodes 22 and 82 are connected in parallel with motors 21 and 81 and are poled in such manner that the back electromotive force generated in motors 21 and 81 causes them to break down when respective motors 21 and 81 reach a predetermined terminal or rapid wind speed.

It will be noted that motors 21 and 81, when connected in the manner described above and shown in FIG. 1, assume one of two possible conditions or states. Using motor 21 as an example, when tension switch 25 is closed, the armature of motor 21 is effectively short-circuited between source 23 and ground. If the rotor of motor 21 is rotated in this situation, conduction path 30 and the path extending through closed switch 25 form a closed armature loop and thus permit an armature current to be generated. A torque opposing the rotation of the armature is thus encountered, and it is apparent that motor 21 is in a dynamic braking state. If, on the other hand, tension switch 25 is opened, the path shunting motor 21 is broken. Thus, motor 21 receives power from source 23 and reel 20 is driven counterclockwise to supply tape to capstan 50. This condition is referred to herein as the "power-on" state of motor 21. Motor 81 is controlled in a similar manner by the above-described circuitry including source 83 and switch 88.

Motors 21 and 81 are thus controlled by tension switches 25 and 88, respectively, included in shunt paths from sources 23 and 83 to ground. Tension switches 25 and 88 are connected mechanically to tension arm devices 24 and 84 and are designed to open (in the case of switch 25) or close (in the case of switch 88) when the tension on tape 10 reaches or exceeds a particular predetermined level. Also serially included in the respective shunt paths around motors 21 and 81 are normally-closed rapid wind switches 26 and 89, the operation of which is described below. While the tape recorder is in the idle state, tension switches 25 and 88 and rapid wind switches 26 and 89 are closed, as shown in FIG. 1, and neither motor 21 nor motor 81 receives power.

When drive motor 15 is energized during recording operation, as described above, capstan 50 begins to advance tape 10 incrementally for the recording of information thereon by head 60. As tape 10 is advanced, the tape tension between reel 20 and capstan 50, sometimes referred to as the tape tension on reel 20, increases. Motor 21 is in a state of dynamic braking, with shunt path switches 25 and 26 closed, and there is a reverse torque opposing the turning of reel 20. When the tape tension on reel 20 reaches the predetermined level, tension arm device 24 is deflected, and tension switch 25 opens. With the shunt path through switch 25 broken, source 23 energizes motor 21. Reel 20 is then driven in a counterclockwise direction supplying tape 10 to capstan 50 and reducing the tape tension over tension arm device 24. Motor 21 continues in a power-on state until the tape tension has been reduced sufficiently to permit switch 25 to close again, at which point motor 21 is returned to its dynamic braking state. As capstan 50 advances tape 10 further, motor 21 is controlled in similar fashion by tension switch 25 to maintain the tape tension between reel 20 and capstan 50 within a desired range approximately centered on the predetermined level prescribed by tension arm device 84.

At the same time, as tape 10 is advanced during recording operation, the tape tension between capstan 50 and reel 80, sometimes referred to as the tape tension on reel 80, decreases. When the tape tension on reel 80 falls to the predetermined level, tension arm device 84 opens tension switch 88. Power is then applied to motor 81 by source 83, thereby accelerating motor 81 and driving reel 80 in a counterclockwise direction to increase the tape tension toward the predetermined level. When this level is reached, tension switch 88 again closes shunting the armature of motor 81. Motor 81, placed in a dynamic braking state, decelerates and ultimately reduces the tension between capstan 50 and reel 80 to the predetermined level. As capstan 50 advances the tape further, motor 81 continues to operate in this manner to control the tape tension between capstan 50 and reel 80.

It will be recalled that normally closed rapid wind switches 26 and 89 are connected into the shunt paths around motors 21 and 81 respectively. If it is desired to advance tape 10 rapidly, rapid wind switch 89 is opened. Motor 81 then receives power continuously and accelerates toward its rapid wind speed, determined by the breakdown voltage of Zener diode 82. Concurrently, motor 21 regulates the tape tension on reel 20 in the same manner as it does during incremental stepping, that is, by alternating between power-on and dynamic braking states.

Alternatively, rapid wind switch 26, in conjunction with resistor 27 connected in parallel therewith, can be utilized advantageously to provide tape tension control during rapid wind. If rapid wind switches 26 and 89 are both opened during rapid wind, motor 21 alternates between the full power-on state (when switch 25 is open) and a partial power-on state (when switch 25 is closed and resistor 27 is connected into the armature loop). Motor 21 thereby more effectively controls tape tension during rapid wind operation.

Figure 2:
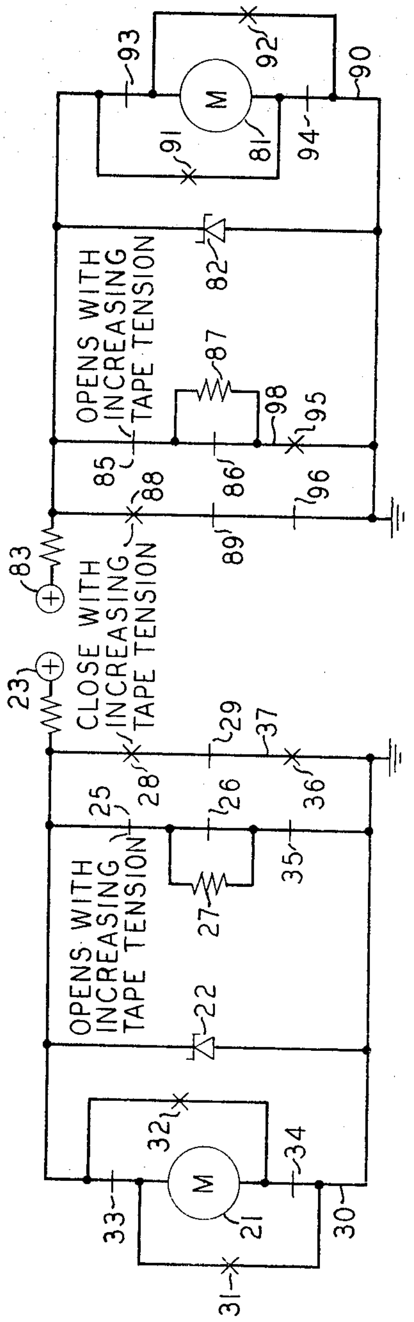
FIG. 2 is a diagram of an illustrative incremental recorder showing circuitry for providing tape tension control and both rapid wind and rapid rewind capability in accordance with the invention.

FIG. 2 of the drawing shows circuitry for providing both wind and rewind operation of the tape in accordance with the present invention. It will be evident that portions of the circuitry shown in FIG. 2 are similar to the circuitry shown in FIG. 1, with additional switches and conduction paths provided to operate and control the supply and take-up reel drive motors in a reverse direction for rewind operation. Like parts are referred to by like reference numerals in FIGS. 1 and 2.

Accordingly, motors 21 and 81 in FIG. 2, which may comprise permanent magnet direct current motors, are respectively linked to supply and take-up tape reels (not shown), such as reels 20 and 80 in FIG. 1, and the tape is driven for recording operation by a capstan drive system (not shown), such as capstan 50 and record drive motor 15 in FIG. 1. The capstan drive system for FIG. 2, must of course, be capable of advancing the tape incrementally in the rewind direction if recording operation in the rewind direction is desired. Motors 21 and 81 in FIG. 2, as in FIG. 1, are connected into conduction paths between sources 23 and 83, respectively, and ground. Zener diodes 22 and 82 are connected in shunt with motors 21 and 81. A shunt path including tension switch 25 and the parallel combination of rapid wind switch 26 and resistor 27 is connected around motor 21 between source 23 and ground. A shunt path including tension switch 88 and rapid wind switch 89 is connected around motor 81 between source 83 and ground.

Circuitry in addition to the circuitry shown in FIG. 1 is provided in FIG. 2 and associated with motors 21 and 81. In particular, direction switches 31, 32, 33 and 34 are associated with motor 21 to permit reversing the connection of motor 21 between source 23 and ground. Direction switches 91, 92, 93 and 94 are similarly associated with motor 81 to permit the connection of motor 81 between source 83 and ground to be reversed. All of the above contacts are in a normal or unoperated position, as shown in FIG. 2, when it is desired to operate the tape recorder in a wind direction.

The shunt paths around motors 21 and 81, described above, are provided with direction switches, namely, direction switch 35 in the path around motor 21 and direction switch 96 in the path around motor 81. These switches are operated, as described hereinafter, when it is desired to reverse the direction of the tape. Additional shunt paths 37 and 98 are also connected around motors 21 and 81, respectively, to provide tape tension control during rewind operation. Shunt path 37 contains serially connected tension switch 28, operated by a tension arm device (not shown), rapid rewind switch 29, and direction switch 36. Shunt path 98 contains serially connected tension switch 85, operated by a tension arm device (not shown), the parallel combination of rapid rewind switch 86 and resistor 87, and direction switch 95. The tension arm devices (not shown) which operate tension switches 28 and 85 are similar to those operating tension switches 25 and 88 in FIG. 1.

Tension switches 25 and 85 open with increasing tape tension and tension switches 28 and 88 close with increasing tape tension. Rapid wind switches 26 and 89 and rapid rewind switches 29 and 86 are closed during recording operation. All other switches reside in the respective states shown in FIG. 2 during wind operation and are operated to their opposite states during rewind operation.

The operation of the circuitry shown in FIG. 2 during wind of the tape is substantially the same as described above in connection with FIG. 1. With tension switches 31, 32, 91 and 92 open, motors 21 and 81 are effectively connected in the same manner as in FIG. 1, and direction switches 36 and 95 prevent current from flowing through shunt paths 37 and 98. It is evident that the remainder of the circuitry shown in FIG. 2, the operative circuitry during wind operation, is essentially identical to the circuitry of FIG. 1. Thus the tape tension is controlled during recording operation in the wind direction and rapid wind operation in a manner substantially identical to that described above in connection with FIG. 1.

During rewind operation, on the other hand, each of direction switches 31 through 36 and 91 through 96 is respectively operated to a state opposite that shown in FIG. 2. For example, switches 31 and 32, associated with motor 21, are closed and switches 33 and 34 are opened thereby reversing the connection of motor 21 between source 23 and ground. Motor 21 thus rotates in an opposite direction and rewinds the tape on to the supply reel when power is applied. Similarly, the operation of switches 91 through 94 causes motor 81, when energized, to rotate in a reverse direction and supply tape from the take-up reel. In addition, shunt paths 37 and 98 between respective sources 23 and 83 and ground through respective direction switches 36 and 95 are closed, and the similar paths through switches 35 and 96 are open.

During recording operation in the rewind direction tension switches 28 and 85 operate in the same manner as do switches 25 and 88 during wind operation to provide power to motors 21 and 81 at appropriate times thereby maintaining tape tension in the desired range around the predetermined level. As the capstan (not shown) advances the tape in the rewind direction and the tension between the take-up reel and the capstan increases, tension switch 85 opens permitting motor 81 to receive power from source 83. Also, motor 81 accelerates, feeding tape from the take-up reel to the capstan. As tension decreases between the capstan and the supply reel, tension switch 28 opens, and motor 21 is energized to rewind the tape onto the supply reel.

If rapid rewind is desired, rapid rewind switches 29 and 86 ar opened. Continuous power in the rewind direction is then applied to motor 21, and the tape is rewound onto the supply reel. Keeping switch 86 open, motor 41 receives full or partial power while tension switch 85, controlled by the tape tension between the capstan and the take-up reel, opens and closes. The tape, as a result, is advanced rapidly in the rewind direction until rapid rewind switches 29 and 86 are again closed.

The embodiment of the present invention described herein, accordingly, is a simple and economical arrangement for controlling the tape tension in a magnetic tape recorder while at the same time providing fast wind and rewind capability. It is to be understood, however, that the particular arrangements described above are merely illustrative of the application of the principles of the invention. Numerous other arrangements may be devised by those skilled in the art without departing from the spirit and scope of the invention.

What is claimed is:

1. In a tape recorder:
a supply reel,
a take-up reel,
tape wound on said supply and take-up reels and extending therebetween,
first and second permanent magnet direct current motors linked respectively to said supply and take-up reels,
first and second tape tension responsive means associated respectively with said supply and take-up reels, and
first and second control means associated respectively with said first and second motors each comprising a power source, a power conduction path connected serially to said motor, a shunt conduction path connectable in paralle with said motor, and a tension switch responsive to the associated tape tension means for controlilng the connection of said conduction path across said motor.

2. A tape recorder in accordance with claim 1 additionally comprised respective normally closed switches serially interconnected into said shunt conduction paths in said first and second control means, opening of said switches providing rapid transport of said tape between said supply and take-up reels.

3. A tape recorder in accordance with claim 2 additionally comprising a resistor connected in shunt with at least one of said normally closed switches.

4. In a tape recorder,
first and second tape reels,
tape wound on said first and second tape reels and extending therebetween,
a capstan drive system for transporting said tape between said first and second reels during the recording operation, and
first and second motor means associated respectively with said first and second reels each comprising a direct current motor, a power source connected to said motor, and a shunt path around said motor containing a tension switch and a rapid wind switch,
said first motor means rotating said first reel when the tension of said tape wound on said first reel exceeds a predetermined level and opposing rotation of said first reel when the tension of said tape wound on said first reel is below said predetermined level, and
said second motor means rotating said second reel when the tension of said tape wound on said second reel is below said predetermined level and opposing rotation of said second reel when the tension of said tape wound on said second reel exceeds said predetermined level.

5. A tape recorder in accordance with claim 4 wherein said first tension switch opens when the tape tension on said first tape reel reaches said predetermined level and wherein said second tension switch closes when the tape tension on said second reel reaches said predetermined level.

6. A tape recorder in accordance with claim 6 additionally comprising third motor means associated with said first reel for rotating said first reel when the tension of said tape wound on said first reel is below said predetermined level and for opposing rotation of said first reel when the tension of said tape wound on said first reel exceeds said predetermined level, said third motor means comprising said first motor, means for reversing the polarity of said first motor, a first direction switch connected into said first motor shunt path, and a rewind path around said first motor, said first motor rewind shunt path containing a third tension switch, a third direction switch, and a first rapid rewind switch; and additionally comprising fourth motor means associated with said second reel for rotating said second reel when the tension of said tape wound on said second reel exceeds said predetermined level and for opposing rotation of said second reel when the tension of said tape wound on said second reel is below said predetermined level, said fourth motor means comprising said second motor, means for reversing the polarity of said second motor, a second direction switch connected into said second motor shunt path, and a rewind shunt path around said second motor, said second motor rewind shunt path containing a fourth tension switch, a fourth direction switch, and a second rapid rewind switch.

7. A tape recorder in accordance with claim 6 wherein said third tension switch closes when the tape tension on said first tape reel reaches said predetermined level and wherein said fourth tension switch opens when the tape tension on said second tape reel reaches said predetermined level.

8. A tape recorder in accordance with claim 7 additionally comprising a first resistor in parallel with said first rapid wind switch and a second resistor in parallel with said second rapid rewind switch.

References Cited

UNITED STATES PATENTS

| | | | |
|---|---|---|---|
| 2,656,129 | 10/1953 | De Turk et al. | 242—75 |
| 2,904,275 | 9/1959 | Selsted et al. | 242—55.12 |
| 3,203,636 | 8/1965 | Owen | 242—55.12 |
| 3,318,546 | 5/1967 | Bejach | 242—55.12 |
| 3,370,189 | 2/1968 | Haydon et al. | 310—156 X |

LEONARD D. CHRISTIAN, Primary Examiner

U.S. Cl. X.R.

318—7

UNITED STATES PATENT OFFICE
CERTIFICATE OF CORRECTION

Patent No. 3,512,733 Dated May 19, 1970

Inventor(s) Cyrus F. Ault

It is certified that error appears in the above-identified patent and that said Letters Patent are hereby corrected as shown below:

Claim 6, line 1, change "in accordance with claim 6" to --in accordance with claim 5--.

Signed and sealed this 18th day of January 1972.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE 1969 O—366-334